United States Patent
Salito

[19]

[11] Patent Number: 6,113,991
[45] Date of Patent: *Sep. 5, 2000

[54] METHOD FOR COATING A CARBON SUBSTRATE OR A NON-METALLIC CONTAINING CARBON

[75] Inventor: Armando Salito, Wohlen, Switzerland

[73] Assignee: Sulzer Metco AG, Wohlen, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/994,296

[22] Filed: Dec. 19, 1997

[30] Foreign Application Priority Data

Dec. 24, 1996 [CH] Switzerland .............. 3185/96

[51] Int. Cl.⁷ ........................................... C23C 4/08
[52] U.S. Cl. ........................................... 427/455; 427/454
[58] Field of Search ..................... 427/454, 455

[56] References Cited

U.S. PATENT DOCUMENTS 4,751,099  6/1988  Niino et al. .............. 427/455
5,045,407  9/1991  Ritter ....................... 427/455
5,312,650  5/1994  Dalal et al. .............. 427/295
5,695,883  12/1997 Harada et al. ........... 427/455

FOREIGN PATENT DOCUMENTS 4-59978  2/1992  Japan .

*Primary Examiner*—Katherine A. Bareford
*Attorney, Agent, or Firm*—Tarolli, Sundheim, Covell, Tummino & Szabo L.L.P.

[57] ABSTRACT

To provide a substrate consisting of carbon or non-metallic materials containing carbon with a layer of a metal having a high melting point, first an undercoat layer is applied to the substrate by plasma spraying in an inert atmosphere. The undercoat layer predominantly consists of rhenium, molybdenum, zirconium, titan, chrome, niobium, tantalum, hafnium, vanadium, platinum, rhodium or iridium. Onto that undercoat layer, a covering layer can be applied, by plasma spraying as well. In order to reduce the thermo-mechanical stress and to improve the adhesion of the undercoat layer on the surface of the substrate, the substrate is preheated prior to applying the undercoat layer. By means of such a method, carbon-containing substrates can be provided with an undercoat layer and, if required, with a covering layer quickly and reliably at low costs.

23 Claims, 3 Drawing Sheets

METHOD FOR COATING A CARBON SUBSTRATE OR A NON-METALLIC CONTAINING CARBON

FIELD OF THE INVENTION

The present invention refers to a method for coating a carbon substrate or a non-metallic substrate containing carbon to provide at least one layer on the surface of said substrate. Moreover, the invention also refers to a carbon substrate or a non-metallic substrate containing carbon provided with at least one undercoat layer applied by means of the method according to the present invention.

In order to provide a carbon substrate or a non-metallic substrate containing carbon with a layer, for instance a layer consisting of a metal having a high melting point, and to provide for a reliable adhesion of that layer on the substrate, it is common practice first to apply to the substrate a primer layer in the form of an undercoat layer. As a base material for such an undercoat layer which may be subjected to very high temperatures, for instance rhenium has proven to be very efficient. However, one problem in applying such an undercoat layer onto one of the above mentioned substrates may be seen in the fact that the adhesion between the layer to be applied and the carbon substrate or a non-metallic substrate containing carbon is, as a rule, insufficient at the grain boundary between substrate and undercoat layer.

A further problem occurring with such a coating process consists in that some of the preferred layer materials have very high melting points, for instance rhenium with a melting point above 3400 Kelvin. It is understood that an application of the material in a molten state, such material having a melting point in excess of 1500 Kelvin, presents considerable difficulties.

PRIOR ART

In order to reliably apply an undercoat layer, consisting e.g. of rhenium, onto a carbon substrate or a non-metallic substrate containing carbon, up to now two method have established, namely electroplating and gas-phase stripping.

Both the method of electroplating and the method of gas-phase stripping have the common fundamental disadvantages that they need a lot of time and that only relatively thin layers can be applied. Moreover, due to reasons regarding the protection of the environment, it is preferable to avoid these methods whenever possible. A further problem in conjunction with that two methods may be seen in the fact that it is very lavish to only partially coat a substrate. Additionally, neither the process of electroplating nor the process of gas-phase stripping is suitable for applying layers with a very small grain size. Finally, the reproducibility of that two methods is anything else than perfect, with the result that usually a substantial quantity of coated substrates are not usable.

The German Patent Application DE 33 38 740 A1 discloses a method for selectively precipitating a layer of a metal having a high melting point onto a work piece consisting of graphite. In this method, an undercoat layer, called intermediate layer in that publication, serving as a primer is selectively precipitated onto the selected surface areas of the work piece by means of an electrolytic process. In order to cover the work piece in those areas in which no intermediate layer is to be applied, masks are provided which are to be fixed to the work piece. Subsequently, the covering layer is applied by means of known processes, e.g. by chemical stripping in the gaseous phase. Thereafter, the covering layer consisting of a metal having a high melting point is removed in those areas in which no intermediate layer has been applied. It is understood that such a method is very lavish and costly. Moreover, for each coating process, a new mask has to be provided.

OBJECTS OF THE INVENTION

In order to avoid the above mentioned drawbacks of the methods known in the prior art, it is an object of the invention to provide a method for coating a carbon substrate or a non-metallic substrate containing carbon which can be performed quickly, which is not harmful to the environment and which does not incur high costs, but which nevertheless ensures a reliable adhesion of the applied layer on the substrate.

SUMMARY OF THE INVENTION

To meet these and other objects, the present invention provides a method for coating a carbon substrate or a non-metallic substrate containing carbon to provide at least one layer on the surface of the substrate. According to the invention, in a first step the substrate is heated at its surface to a temperature of between 500° and 2500° Celsius. Then, in a second step, at least one undercoat layer is applied to the substrate by plasma spraying in an inert atmosphere, whereby that undercoat layer at least partially consists of rhenium, molybdenum, zirconium, titanium, chromium, niobium, tantalum, hafnium, vanadium, platinum, rhodium or iridium.

Surprisingly, it has been found that undercoat layers comprising the above mentioned materials and applied by plasma spraying to substrates of the afore mentioned kind adhere particularly well. An explanation therefor could be that the molten particles of the undercoat layer hitting the surface of the substrate with a very high velocity penetrate the surface of the carbon containing substrate and intrude in the numerous small recesses present at the surface thereof.

An advantage of the method of the invention consists in the fact that the substrate can be coated in much shorter time than it was possible up to now, because the application of an undercoat layer by plasma spraying is performed much quicker than it would be possible by using the method of electroplating or the method of gas-phase splitting. A further advantage, as compared to the processes based on galvanization, may be seen in the fact that substantially purer layers can be applied, at least as far as the undercoat layer is concerned. In a process of coating based on galvanization, water and contamination of the galvanic bath can add in a surface region of the substrate, because carbon substrates and non-metallic, carbon containing substrates are porous; the result is that the quality of the undercoat layer is impaired. In this respect, the method according to the invention provides a substantial improvement.

Moreover, in contrast to the processes based on galvanization, the applied undercoat layer has not to be thermally treated subsequent to the coating step, and the chemical composition of the layer to be applied can be controlled much easier. Finally, the method of the invention is much less harmful to the environment because only inert gases like argon, hydrogen or helium are used as operational media and no dangerous waste materials are produced as is the case in processes based on galvanization.

A further advantage of the method according to the invention consists in that selectively only certain areas of the substrate can be coated; such a proceeding is desired in many cases and provides for substantial savings of costly material. By means of the method of the invention, also complicated and angled surface areas of a substrate can be reliably coated.

The method according to the present invention is also particularly advantageous if, as provided for in a preferred embodiment, a covering layer consisting of a metal having a high melting point has to be applied onto the undercoat layer. In such a case, both layers can be applied one immediately after the other one by plasma spraying. The result is that the intrinsic stress of the materials can be substantially reduced because the substrate does not cool down between the application of the undercoat layer and the application of the covering layer. Moreover, such a proceeding provides for a further saving in cost and time.

According to the invention, the step of preheating the substrate is provided, prior to applying the undercoat layer. By such preheating, the adhesion between substrate and undercoat layer is substantially improved again. A possible explanation therefor could be that the heating up of the substrate to a certain minimum temperature favors the intruding of rhenium particles into the carbon lattice. Moreover, it has been found that by performing such a preheating step the thermo-mechanical stress present in the substrate as well as in the undercoat and covering layers can be considerably reduced, particularly if the coated work piece is subjected to very high temperatures during its use and if the materials have substantially different expansion coefficients.

The invention also refers to a carbon substrate or a non-metallic substrate containing carbon provided with at least one undercoat layer applied to the substrate by plasma spraying in an inert atmosphere. The undercoat layer at least partially consists of rhenium, molybdenum, zirconium, titanium, chromium, niobium, tantalum, hafnium, vanadium, platinum, rhodium or iridium. Further, the substrate can comprise a covering layer consisting of tungsten, a tungsten alloy or a tungsten compound and applied to the substrate by plasma spraying.

BRIEF DESCRIPTION OF THE DRAWINGS

In the following, some embodiments of the invention will be further described, with reference to the accompanying, strictly schematic drawings, in which.

DETAILED DESCRIPTION OF SOME EMBODIMENTS

In view of the fact that plasma spraying apparatuses as well as the method of coating a substrate by means of plasma spraying both are well known per se, in the following, only the parts and elements of the apparatus and the method steps which are essential for the present invention will be described in detail.

Figure 1:
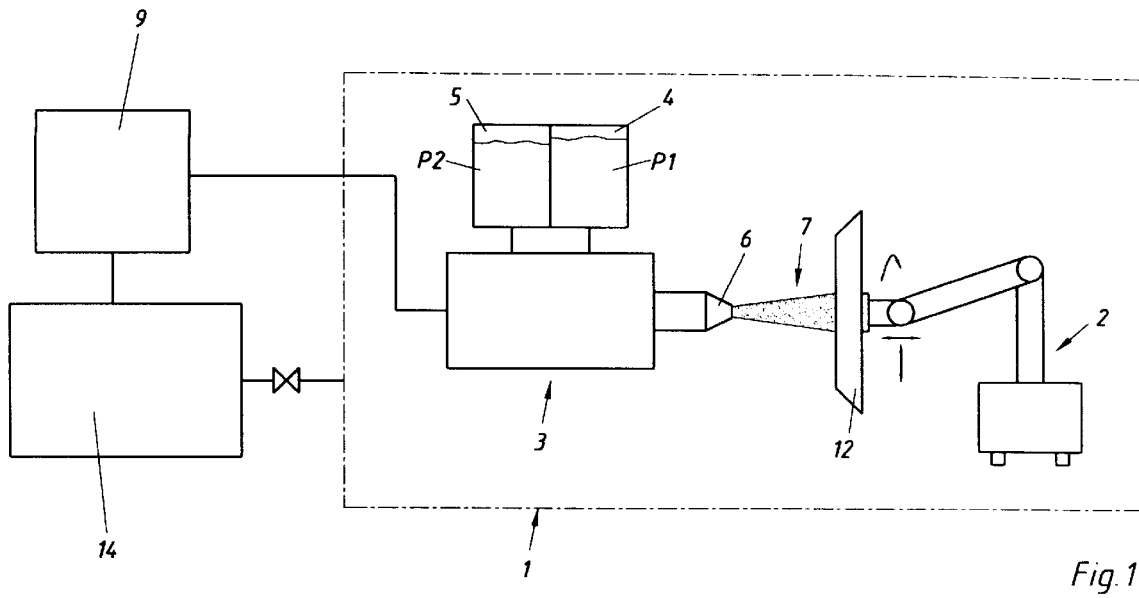
FIG. 1 shows a schematic view of the general layout of a plasma coating assembly for applying one or more layers to a substrate.

FIG. 1 shows a schematic view of the general layout of a plasma coating assembly for applying one or more layers to a substrate. The plasma coating assembly essentially comprises a container or cabinet 1, shown in the drawings only by the way of suggestion as a rectangle in dash-dotted lines. In the interior of this container or cabinet, an atmosphere can be built up which is isolated from the environmental atmosphere. Located in the interior of this container or cabinet 1 are a handling robot 2, a plasma spraying apparatus 3 and a substrate 12 to be coated, consisting for example of carbon material. The infrastructure required for the operation of the plasma spraying apparatus 3, as e.g. a control console, a power supply unit, a pressure regulating unit etc., are shown in FIG. 1 generally as a block 9.

Located above the plasma spraying apparatus 3, two storage containers 4 and 5 are shown in each of which a coating material, e.g. in the form of a coating powder is received. For example, the one container 4 is filled with a powder P1 for the undercoat layer to be applied to the substrate 12, while the other container 5 is filled with a powder P2 for the covering layer to be applied to the substrate 12. The powder P1 can consist, for example, of rhenium, and the powder P2 can consist, for example, of tungsten.

Moreover, the assembly comprises an apparatus 14 by means of which the interior of the container or cabinet 1 can be flooded with an inert gas, e.g. argon. However, the apparatus 14 serves also for evacuating the container or cabinet 1, if required or desired.

By means of the robot 2, the substrate 12 can be moved in the desired directions and planes during the coating operation, as is symbolized by the arrows shown in FIG. 1. It is understood that also a movable plasma spraying apparatus 3 could be provided in place of the robot 2 for moving the substrate 12.

The operation of coating a substrate 12 may be performed as follows, whereby it should be emphasized that the example of operation described herein below is simplified to a great extent and should not have a limiting character in whatsoever way.

First, a defined atmosphere is created in the interior of the container or cabinet 1, comprising the steps of evacuating the interior of the cabinet 1 down to a pressure of approx. $10^{-2}$ mbar and, thereafter, filling the interior of the cabinet 1 with an inert gas, for example argon, until the pressure has reached a value of approx. 100 mbar. Subsequently, the substrate 12 is heated up to a temperature of between 500° and 2500° Celsius by means of the plasma spraying apparatus 3. It is understood that no powder is fed to the plasma spraying apparatus 3 during this step of heating the substrate 12.

As soon as the substrate 12 has reached the desired temperature, powder P1 is fed from the one container 4 to the plasma spraying apparatus 3. This powder is heated in the plasma torch 7 escaping from the nozzle 6 of the spraying apparatus 3 to such an extent that it hits the substrate 12 in a molten condition. In order to build up the desired thickness of the undercoat layer, preferably several individual layers or plies of the molten powder P1 are applied to the substrate 12, one after the other one.

The undercoat layer applied to the substrate 12 serves as a primer layer for a subsequently applied covering layer for which the powder P2 shall be used in the present example. For this purpose, powder P2 is fed from the container 5 to the plasma spraying apparatus 3. In a similar manner, that powder P2 is heated in the plasma torch 7 escaping from the nozzle 6 of the spraying apparatus 3 to such an extent that it hits the substrate 12 and the undercoat layer, respectively, in molten condition.

As materials for the undercoat layer and/or the covering layer, preferably materials are used whose melting point is above 1050 Kelvin and which at least partially consist of a fireproof metal or a fireproof metal alloy. As far as the expression "fireproof" is concerned in this context, reference is made to the DIN norm No. 51060 which approximately defines a fireproof material as a substance which has a Seger cone falling point of at least 1773 Kelvin and which can be industrially used at permanent temperatures in excess of 1073 Kelvin.

Suitable as materials for the undercoat layer, particularly the following materials can be listed, whereby the constituents of the alloys are listed in descending order as far as their quantities in the alloy are concerned:

Metals:
 Rhenium
 Molybdenum
 Zirconium
 Titanium
 Chromium
 Niobium
 Tantalum
 Hafnium
 Vanadium
 Platinum
 Rhodium
 Iridium Alloys:
 Lead—tin—titanium—antimony
 Chromium—phosphorus—silicon—iron—carbon-remainder: nickel
 Chromium—silicon—carbon-remainder: nickel
 Copper—chromium
 Copper—gold—nickel
 Copper—niobium
 Copper—palladium
 Copper—silicon—titanium
 Copper—titanium
 Copper—zinc—manganese—titanium—nickel—tin—aluminum
 Copper—zinc—titanium—antimony—silicon
 Copper—zinc—titanium—tin—silicon
 Copper—tin—titanium
 Nickel—chromium
 Nickel—molybdenum—gold
 Nickel—silicon—boron
 Nickel—titanium
 Palladium—Nickel—chromium
 Phosphorus—carbon-remainder: nickel
 Silver—copper—palladium
 Silver—copper—palladium-soldering alloy
 Silver—copper—titanium
 Alloys with a predominant proportion of titanium, zirconium, chromium, niobium, tantalum, hafnium, vanadium, platinum, rhodium or iridium.

Others:
 Active metals in a ductile matrix, particularly titanium in silver, copper, gold and/or nickel.

As a material for the covering layer, for example pure tungsten, a tungsten alloy or a tungsten compound can be used. Besides tungsten, other materials having a high melting point, i.e. a melting point above 2000 Kelvin, can be considered, as for example tantalum, niobium, zirconium or hafnium, whereby, again, these materials can be used in the form of alloys or compounds and whereby the above examples shall not have final or exclusive character.

The composition of the powder during the transition step from the undercoat layer to the covering layer can be continuously varied, for example by continuously reducing the amount of powder P1 fed to the plasma spraying apparatus per time unit, while simultaneously the amount of powder P2 fed to the plasma spraying apparatus per time unit is continuously increased. However, a discontinuous transition can be realized, i.e. the supply of powder P1 is stopped and the coating operation is continued by feeding powder P2 to the plasma spraying apparatus. Particularly in a discontinuous coating operation, it can be considered to flood the container or cabinet 1 with a different inert gas and/or to adjust the pressure in the interior of the container or cabinet 1 between the end of the application of the undercoat layer and the start of the application of the covering layer.

Finally, the coated substrate 12 is cooled under controlled conditions in the inert atmosphere.

The characteristics of the layer to be applied to the substrate 12 can be controlled by adjusting the operational parameters of the plasma spraying apparatus, i.e. the selection of the plasma gas, amount of the plasma gas, electric arc current, spraying distance, pressure in the interior of the container or cabinet, temperature of the substrate, as well as amount of coating powder fed per time unit and grain size of the powder. A fine tuning of these parameters is important insofar as thereby, amongst else, an optimal melting ratio of the coating particles, when they hit the surface of the substrate, can be realized.

Tests performed by the assignee have shown that the best coating results can be achieved if the velocity of the coating particles entrained in the plasma jet is chosen in excess of 100 m/s, whereby today's realistic upper limit is in the region of 500 m/s.

In order to improve the adhesion of the covering layer on the undercoat layer and/or to vary the structure of the coating according to the particular requirements, the substrate 12 can be provided with an intermediate layer, to be applied after the undercoat layer having been applied. Such an intermediate layer can comprise constituents of the undercoat layer and/or the covering layer, or it can consist of different materials.

In some particular applications of the substrate 12, it is even possible to apply just an undercoat layer, without subsequently applying a covering layer.

It has been found that a heating up of the substrate 12, prior to the application of the undercoat layer, presents the advantage that a penetration of e.g. rhenium particles into the carbon lattice is favored, besides the fact that mechanical stress is removed; thus, the adhesion of the undercoat layer on the substrate 12 is substantially improved.

It is understood that the material of the undercoat layer, being in molten form when hitting the surface of the substrate, also penetrates the open pores of the carbon substrate, with the result that already a very good basic adhesion of the undercoat layer on the surface of the substrate 12 is ensured.

The pressure in the interior of the container or cabinet 1 can be chosen according to the particular requirements.

Normally, a pressure of between 1 mbar and approx. 4 bar is established in the interior of the container or cabinet 1 during the coating operation. Moreover, depending on the particular application or requirement, it can be considered to flood the container or cabinet 1 with a reactive gas instead of an inert gas.

If the substrate 12 is preheated and if the covering layer is applied immediately subsequent to the application of the undercoat layer, the advantage results that no substantial thermo-mechanical stress is observed, neither between the individual layers nor between the substrate and the undercoat layer, because the undercoat layer remains at a constant high temperature even during the transition step from applying the undercoat layer to applying the covering layer. Such a proceeding can be particularly wise if the coated substrate is to be used in a very hot environment. As a examples, graphite bricks used in the nuclear fusion process or anodes for X-ray tubes can be named which predominantly consist of a substrate of graphite or a substrate of carbon fiber compound materials provided with a covering layer of tungsten serving as a high temperature protective layer during the nuclear fusion reaction and during the emission of X-rays in X-ray tubes, respectively. In fact, the surfaces of such graphite bricks or anodes can be subjected to very high temperatures during operation.

In the following, some examples of preferred, but not exclusive or limiting combinations of layers shall be further described which can be applied to graphite substrates or non-metallic graphite-based substrates by means of the method according to the invention. The illustrations of FIGS. 2–6 shall be understood as being strictly schematic, showing in each case a partial cross sectional view of the substrate, together with the applied layer(s), in a greatly enlarged scale.

Figure 2:
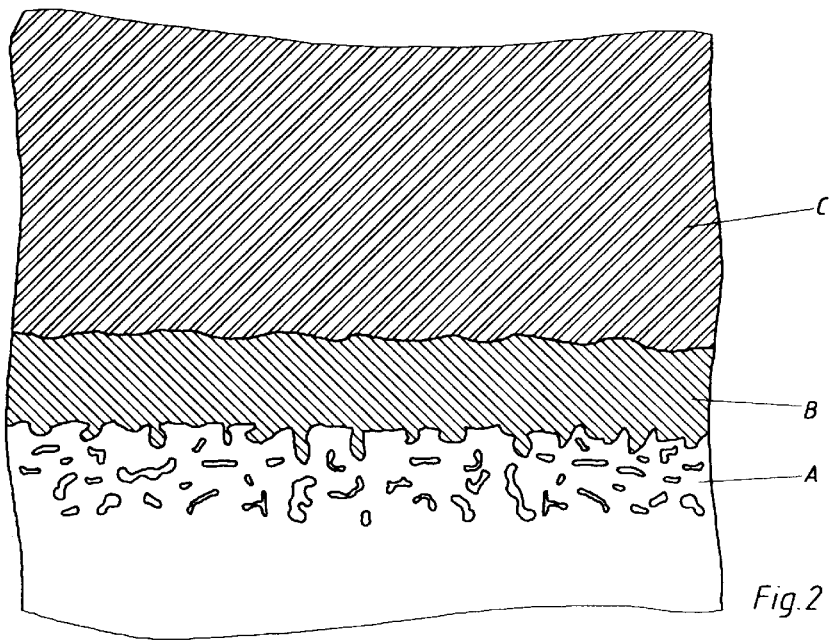
FIG. 2 shows a partial cross sectional view of a first substrate in a very large scale.

FIG. 2 shows a substrate A, the surface thereof having been provided with an undercoat layer B of rhenium which, in turn, has been provided with a covering layer C of tungsten.

By varying the temperature of the substrate and/or the temperature of the plasma jet and the coating particles entrained therewith, respectively, chemical linkages can be created between the chemical elements of the carbon containing substrate, the rhenium and the metal of the covering layer having a high melting point. Such chemical linkages are symbolized as intermediate layers D and E in FIG. 3.

Moreover, by adjusting the operational parameters of the plasma spraying apparatus, a certain structure, e.g. a crystalline structure, between the undercoat layer B of rhenium and the covering layer C consisting of a metal having a high melting point can be effected; thereby, for example the thermo-mechanical characteristics of the finished coated product can be optimized.

In addition, not only the substrate, but also each layer applied thereonto comprises a controlled porosity and micro-porosity, respectively, which can be varied within certain limits according to the particular requirements.

By means of the method of the present invention, undercoat layers having a thickness of between 1 μm and more than 1 mm, and covering layers having a thickness of between 20 μm and more than 10 mm can be applied.

Figure 3:
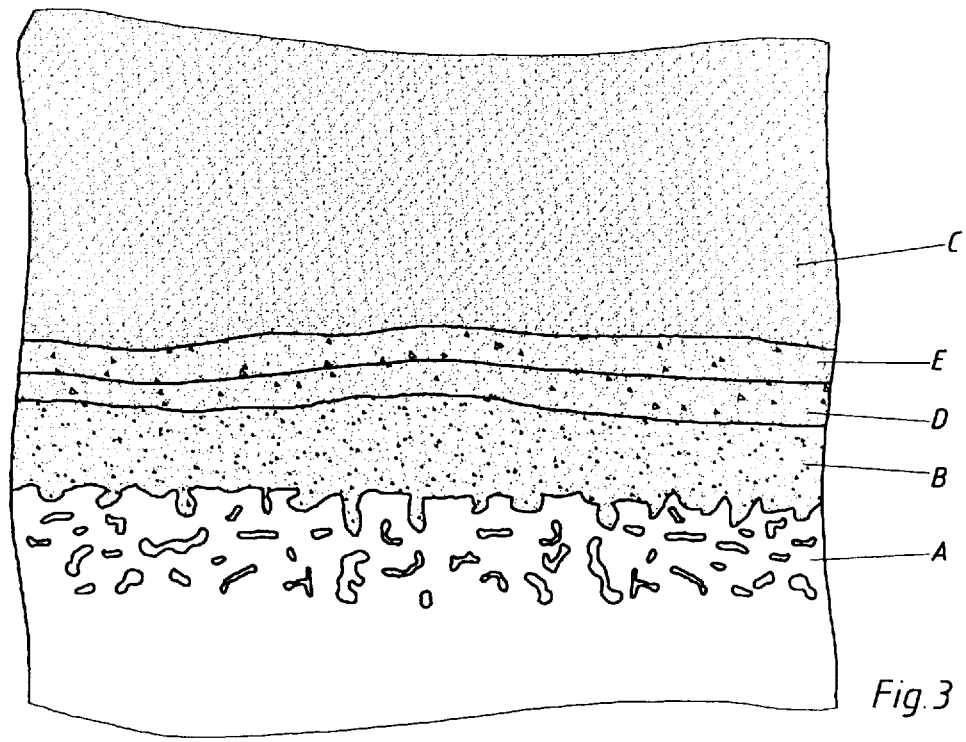
FIG. 3 shows a partial cross sectional view of a second substrate in a very large scale.

FIG. 3 shows a partial cross sectional view of a substrate A onto which an undercoat layer B consisting of rhenium has been applied. The covering layer consisting of tungsten is designated by reference sign C. Between the undercoat layer A and the covering layer C, two intermediate layers D, E are provided which have been generated by a chemical reaction between the substrate A, the undercoat layer B and the covering layer C and which consist of constituents thereof.

Figure 4:
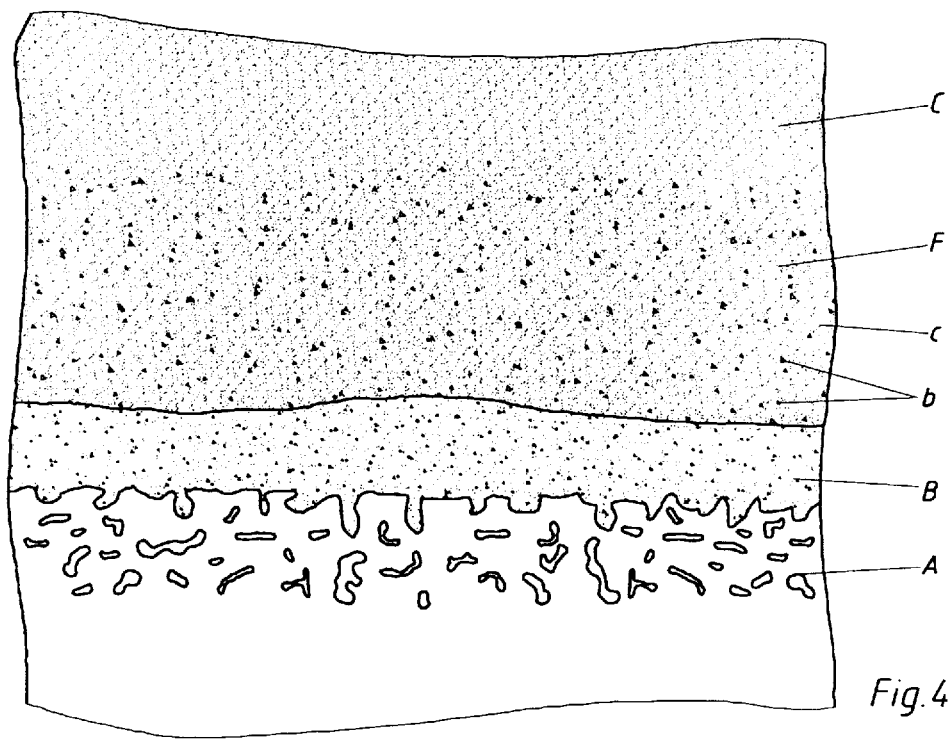
FIG. 4 shows a partial cross sectional view of a third substrate in a very large scale.

FIG. 4 shows a partial cross sectional view of a substrate A onto which an undercoat layer B consisting of rhenium has been applied. The covering layer consisting of tungsten is designated by reference sign C. Between the undercoat layer A and the covering layer C, an intermediate layer F has been provided which consists of a mixture of rhenium and tungsten particles.

Figure 5:
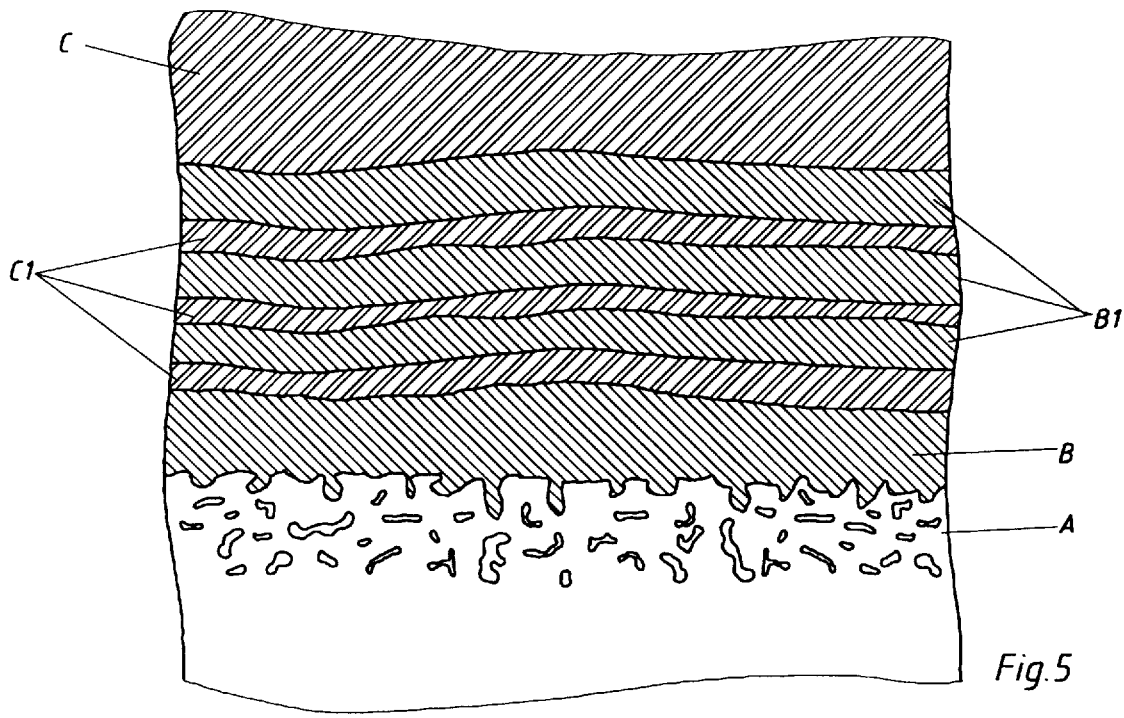
FIG. 5 shows a partial cross sectional view of a fourth substrate in a very large scale.

FIG. 5 shows a partial cross sectional view of a substrate A which has been provided with several intermediate layers B1 consisting of rhenium and C1 consisting of tungsten in alternating order. However, the undercoat layer B, again, consists of rhenium, while the covering layer C consists of tungsten. The thickness of each particular layer can be varied according to the requirements to be fulfilled. The composition of the layers B1 and C1 can vary as a result of a chemical reaction between the individual layers and can comprise elements of the one as well as of the other layer.

Figure 6:
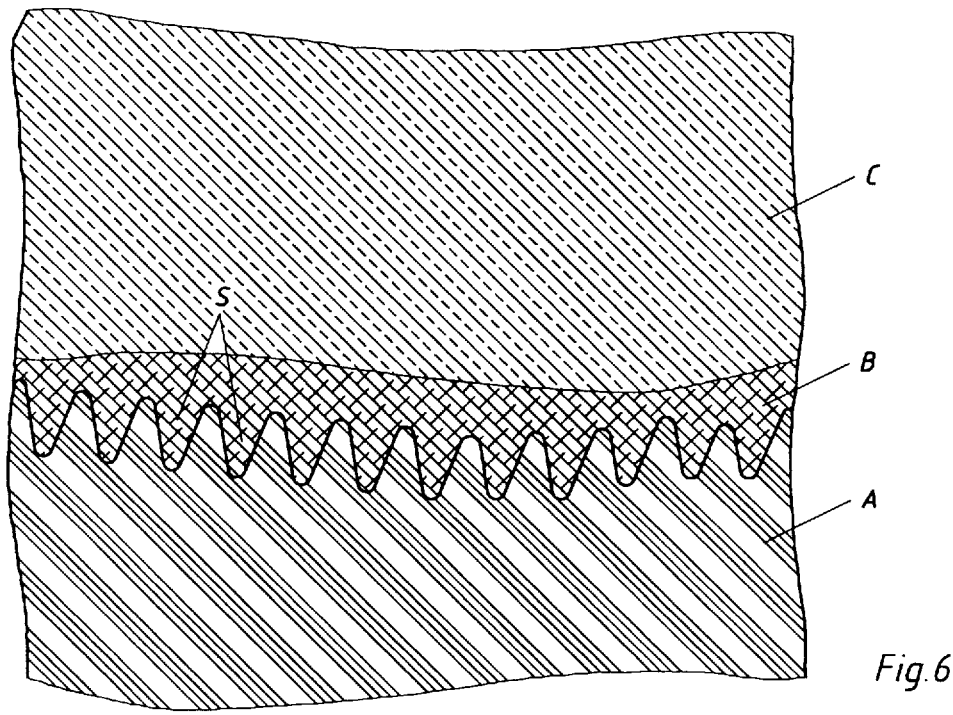
FIG. 6 shows a partial cross sectional view of a fifth substrate in a very large scale whose surface has been provided with a structure.

Finally, FIG. 6 shows a partial cross sectional view of a substrate A, the surface of which has been provided with a structure S. Such structure S can be realized, for example, mechanically, chemically or by means of a laser. Generally, the purpose of such a structuring and a structuring in general, respectively, may be seen in the fact that the surface area of the substrate is enlarged whereby the coefficients of expansion of the substrate and the undercoat layer can be adapted to each other with the result that the adhesion is further increased and the intrinsic stress of the undercoat layer is reduced. The application of the undercoat layer B by plasma spraying has, in this connection, the advantage that the recesses in the surface of the substrate are completely filled with the molten material of the undercoat layer thanks to the high velocity of the particles thereof. Thereafter, the covering layer C is applied as usual.

To sum up, it can be stated that carbon substrates and non-metallic substrates containing carbon, respectively, can be provided with a layer and layers, respectively, quickly, in an environment-friendly manner and at low costs by means of the method according to the present invention. Moreover, the thickness of the layer and layers, respectively, can be varied within comparatively wide limits. A further advantage of the method according to the present invention can be seen in the fact that even very large substrates can be coated easily. Finally, it should be pointed out that the applied layers adhere very well to each other and to the substrate itself.

What is claimed is:

1. A method for coating a carbon substrate to provide at least one layer on the surface of the substrate, the method comprising the steps of:

heating the substrate at its surface to a temperature of between 500° and 2500° Celsius; and applying at least one undercoat layer to the substrate, while the substrate is at a temperature of between 500° C. and 2500° C., by plasma spraying in an inert atmosphere, the at least one undercoat consisting essentially of rhenium.

2. The method according to claim 1 in which the substrate is heated by means of plasma spraying means also used for applying the at least one undercoat layer.

3. The method according to claim 1 in which the surface of the substrate is roughened mechanically, chemically, or by means of a laser means prior to applying the at least one undercoat layer.

4. The method according to claim 1, further comprising the step of applying a covering layer to the undercoat layer by means of plasma spraying.

5. The method according to claim 4 wherein a metallic material having a melting point above 2000 K is used for applying the covering layer.

6. The method according to claim 4 in which the covering layer is applied in an atmosphere sealed with respect to the environmental atmosphere.

7. The method according to claim 6 in which the sealed atmosphere is predominantly constituted of an inert gas.

8. The method according to claim 4 in which the undercoat layer and/or the covering layer consists of a material which comprises a fireproof metal or a fireproof metal alloy.

9. The method according to claim 4 in which the undercoat layer and the covering layer are applied in an atmosphere sealed against the environmental atmosphere, whereby the sealed atmosphere has a pressure which is maintained at a value of between 1 mbar and 4 bar.

10. The method according to claim 4 in which the covering layer is applied in a thickness of between 20 $\mu$m and 10 mm.

11. The method according to claim 4 in which an intermediate layer is applied to the undercoat layer by plasma spraying.

12. The method according to claim 11 in which the intermediate layer comprises constituents both from the undercoat layer and the covering layer.

13. The method according to claim 4 in which the covering layer at least partially consists of tungsten, a tungsten alloy, or a tungsten compound.

14. The method according to claim 4 in which the covering layer comprises rhenium, tantalum, niobium, zirconium or hafnium.

15. The method according to claim 4 in which the undercoat layer and the covering layer are applied one after the other one by means of the same plasma spraying means.

16. The method according to claim 15 in which a continuous transition from the application of the undercoat layer to the application of the covering layer is performed, whereby the amount per time unit of coating material for the undercoat layer fed to the plasma spraying means is continuously reduced, while simultaneously the amount of coating material for the covering layer for per time unit to the plasma spraying means is continuously increased.

17. The method according to claim 15 in which an atmosphere sealed against the environmental atmosphere is maintained both during the application of the undercoat layer and the covering layer, the sealed atmosphere being constituted primarily by an inert gas.

18. The method according to claim 4 in which first the undercoat layer and then the covering layer is applied to the substrate, whereby the application of the covering layer is performed in an atmosphere sealed against the environmental atmosphere and is different from the inert atmosphere maintained during the step of applying the undercoat layer.

19. The method according to claim 1 wherein the undercoat is plasma sprayed to the substrate at a velocity of more than 100 m/s.

20. The method according to claim 1 in which the undercoat layer is applied in a thickness of between 1 $\mu$m and 1 mm.

21. The method according to claim 1 in which the material used for the application of the undercoat consists of rhenium.

22. The method according to claim 1 in which a substrate is used which consists essentially of carbon fiber compound material.

23. The method according to claim 1 in which a substrate is used which consists essentially of graphite.

* * * * *